Patented Oct. 25, 1932

1,884,433

UNITED STATES PATENT OFFICE

WILLIAM R. WEBB, OF BERLIN, GERMANY, AND HANS T. CLARKE, OF NEW YORK, N. Y., ASSIGNORS TO EASTMAN KODAK COMPANY, OF ROCHESTER, NEW YORK, A CORPORATION OF NEW YORK

CELLULOSE ACETATE COMPOSITION

No Drawing.  Application filed August 9, 1929.  Serial No. 384,805.

This invention relates to a new composition of matter in which cellulose acetate is combined or mixed with other substances in order that the resulting product may be advantageously used in plastic and analogous arts, such as in the manufacture of lacquer, varnish, sheets, or photographic film.

It has been proposed to employ for the manufacture of plastic compounds composed of cellulose acetate certain substances which, when added thereto, render the compounds non-inflammable. It is likewise customary to combine with these esters various organic compounds which either aid in increasing the plasticity or flexibility of the dopes that result therefrom. Particularly in the photographic art it is essential that films produced from cellulose acetate be transparent, strong and flexible, and when used in the manufacture of amateur motion picture film, they must be capable of being formed in the desired thickness and likewise having a high degree of non-inflammability.

The object of the present invention is to provide cellulose acetate compositions having the hereinabove described characteristics and in a marked degree the quality of non-inflammability.

We have found that when cellulose acetate is combined with the trihalogen aryl phosphates the products obtained have many unexpected qualities. Photographic films containing any of the compounds coming under this class show a high degree of non-inflammability, the propagation of combustion of the composition is retarded to such an extent, by its addition, that films when ignited often go out and must be re-ignited several times when being tested to determine their relative burning qualities. The films also show a high degree of transparency and flexibility and they, therefore, readily pass the strict requirements of the photographic manufacture.

The types of trihalogen aryl phosphates which we have found most suitable for our purpose are the tri-o-chlorophenyl phosphate and the tri-p-chlorophenyl phosphate. The mono and dichlorinated phenyl phosphates while they are suitable as plastifiers and softeners in cellulose acetate compositions do not, however, impart as high a degree of non-inflammability to the film as is obtained from the use of the trichlorinated phenyl phosphates.

We shall now give several examples of the method of compounding these materials but it will be understood that we shall not be restricted by the proportions given therein except as indicated in the appended claims. A solution of cellulose acetate may be obtained by dissolving 100 parts of cellulose acetate in a solution containing 300 to 500 parts of acetone in which 5 to 20 parts of tri-p-chlorophenyl phosphate have been dissolved. The most optimum proportion we have found is 100 parts of cellulose acetate, 15 parts of tri-p-chlorophenyl phosphate and 400 parts of acetone.

A solution may be made by dissolving 100 parts of cellulose acetate in 300 to 500 parts of acetone in which 5 to 35 parts of tri-o-chlorophenyl phosphate have been dissolved. The optimum proportions consist in 100 parts of cellulose acetate dissolved in 400 parts of acetone containing 20 parts of tri-o-chlorophenyl phosphate.

The above compositions may likewise contain other organic or inorganic ingredients which, as is well known by those skilled in the art, increase the flowability or plasticity of the product obtained by casting or otherwise forming products by removing the volatile constituents from the composition. Nonsolvents may likewise be added to the solutions but, of course, not in sufficiently large amounts to cause precipitation of the cellulose acetate therefrom. We may add one or more organic bodies of only slight volatility for regulating the smooth film flowing qualities of the composition and thereby making it possible to use these compositions in cellulose lacquers. Examples of them are the amyl and butyl alcohols, the so-called "high-boiling" solvents or mixtures of them.

Various modifications may be made in the proportions given in the above examples, and equivalents of the non-inflammability inducing agents be used, without departing in any measure from the invention or sacrificing any of advantages derived therefrom.

Having thus described our invention, what we claim as new and desire to secure by Letters Patent is:—

1. A composition of matter which has a high degree of practical non-inflammability comprising cellulose acetate and a trichlorophenyl phosphate.

2. A composition of matter which has a high degree of practical non-inflammability comprising cellulose acetate, a tri-o-chlorophenyl phosphate and a solvent common to both.

3. An article of deposited or flowed cellulose acetate, tri-o-chlorophenyl phosphate and a material which increases the flowability threof, the article having a high degree of practical non-inflammability.

4. A composition of matter which has a high degree of practical non-inflammability comprising 100 parts of cellulose acetate, 5 to 35 parts of tri-o-chlorophenyl phosphate and 300 to 500 parts of acetone.

Signed at Berlin, Germany, this 19th day of July 1929.

WILLIAM R. WEBB.

Signed at Rochester, N. Y., this 6th day of August 1929.

HANS T. CLARKE.